US007905586B2

(12) United States Patent
Seki et al.

(10) Patent No.: US 7,905,586 B2
(45) Date of Patent: Mar. 15, 2011

(54) MOLDED INK CARTRIDGE COMPRISING A POLYPROPYLENE-BASED RESIN COMPOSITION AND METHOD OF MAKING THE SAME

(75) Inventors: Yuichi Seki, Nagano-ken (JP); Haruki Fukushima, Nagano-ken (JP); Tshihiko Aoki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 922 days.

(21) Appl. No.: 11/374,470

(22) Filed: Mar. 13, 2006

(65) Prior Publication Data

US 2006/0203052 A1 Sep. 14, 2006

(30) Foreign Application Priority Data

Mar. 14, 2005 (JP) .............................. P.2005-071014

(51) Int. Cl.
*B41J 2/175* (2006.01)

(52) U.S. Cl. ........................................................ 347/86

(58) Field of Classification Search .................... 347/86, 347/87; 528/502 R; 524/110, 197, 570; 525/71, 240; 526/118; 156/69

See application file for complete search history.

(56) References Cited

U.S. PATENT DOCUMENTS 3,904,565 A * 9/1975 Yoshiura et al. .............. 524/110
4,364,783 A * 12/1982 Theodore et al. ............... 156/69
4,528,328 A * 7/1985 Ranade et al. .................. 525/71
4,689,640 A 8/1987 Shimomura
5,109,066 A * 4/1992 Ilenda et al. .................... 525/71
6,150,481 A * 11/2000 Winter et al. ................. 526/118
6,250,750 B1 * 6/2001 Miyazawa et al. .............. 347/87
6,787,608 B2 * 9/2004 VanDun et al. ............... 525/240
6,995,235 B1 * 2/2006 Ehrman et al. ............ 528/502 R
2001/0041761 A1 * 11/2001 Oobayashi et al. ........... 524/197
2004/0106723 A1 * 6/2004 Yang et al. .................... 524/570

FOREIGN PATENT DOCUMENTS

EP 1 038 678 9/2000
JP 5-270001 10/1993
JP 7-125238 5/1995
JP 10-16249 1/1998

OTHER PUBLICATIONS

Computer-Generated English Translation of Specification and Claims and Patent Abstracts of Japan of JP 10-16249 dated Jan. 20, 1998.

Computer-Generated English Translation of Specification and Claims and Patent Abstracts of Japan of JP 7-125238 dated May 16, 1995.

Computer-Generated English Translation of Specification and Claims and Patent Abstracts of Japan of JP 5-270001 dated Oct. 19, 1993.

* cited by examiner

*Primary Examiner* — Stephen D Meier
*Assistant Examiner* — Carlos A Martinez, Jr.
(74) *Attorney, Agent, or Firm* — Ladas & Parry LLP

(57) ABSTRACT

The invention provides an ink cartridge including a molded article including a polypropylene-based resin composition, the polypropylene-based resin composition including: (A) a polypropylene-based resin polymerized by a gas-phase method and having a weight-average molecular weight of $2.0\times10^5$ to $2.5\times10^5$; and (B) a hydroxide of an alkali earth metal, and a method for producing the ink cartridge.

11 Claims, 6 Drawing Sheets

MOLDED INK CARTRIDGE COMPRISING A POLYPROPYLENE-BASED RESIN COMPOSITION AND METHOD OF MAKING THE SAME

The present application is based on Japanese Patent Application No. 2005-71014 filed on Mar. 14, 2005, and the contents thereof are incorporated herein by reference.

BACKGROUND

1. Technical Field

The present invention relates to an ink cartridge and a method for producing the ink cartridge, and more particularly to an ink cartridge comprising a molded article including a polypropylene-based resin polymerized by a gas-phase method and a method for producing the ink cartridge.

2. Related Art

A printer of a type utilizing a liquid ink for recording, particularly a printer of ink jet type, utilizes an ink cartridge as disclosed, for example, in References 1-3.

Such ink cartridges include one molded with a polypropylene-based (hereinafter simply referred to as PP) resin.

An ink cartridge molded from such polypropylene-based resin may have, for example, a form as shown in FIG. 1. The ink cartridge of the form shown in FIG. 1 is assembled by contacting a cartridge main body 15 and a cover member 13 as shown in FIG. 2, and applying a pressure and a vibration thereby executing a vibration-welding.

The polypropylene-based resin employed for molding the cartridge main body 15 and the cover member 13, of such ink cartridge is prepared in the following manner.

At first, in a hydrocarbon solvent, propylene gas is injected in the presence of a metal chloride catalyst and under heating and pressurizing to synthesize PP by polymerization, thereby obtaining PP powder. This process is called a solvent method. The obtained PP powder may be inconvenient for handling because of its form, and contains free chlorine ions which are derived from the metal chloride catalyst and which may affect a service life and the like of the molded article. For avoiding these drawbacks, the PP powder is mixed with a chlorine ion neutralizer formed by a fatty acid metal salt and processed in a pelletizer to obtain PP pellets including reduced free chlorine ions and having an appropriate particle size.

The cartridge main body 15 and the cover member 13 have been molded from such PP pellets.

However, the solvent method for producing the polypropylene-based resin has been associated with limitations of a high cost of raw materials and of requiring complex and large facilities.

These drawbacks have been solved by a suitable metal chloride catalyst which has been found later and has enabled the polymerization-production of polypropylene-based resin by a gas-phase method. The neutralization of free chlorine ions derived from the catalyst and the palletizing are conducted in the same manner as in the solvent method.

The polymerization-production of polypropylene-based resin by the gas-phase method is lower in the cost of the raw materials and allows to use simpler and smaller facilities, in comparison with the solvent method.

The neutralization of free chlorine ions derived from the catalyst and the palletizing are same as in the solvent method.

Reference 1: JP-A-5-270001

Reference 2: JP-A-7-125238

Reference 3: JP-A-10-16249

However, an assembling of an ink cartridge by vibration-welding, tried with a cartridge main body 15 and a cover member 13 molded with a polypropylene-based resin polymerized by the gas-phase method, has resulted in a drawback that mutually contacting portions (director portions) thereof are broken and a satisfactory welding has not been attained.

Also when an ink is contained in a container utilizing such PP, including that obtained by the prior solvent method, and is maintained in a harsh environment (high temperature or low temperature) for a prolonged period (for example, about 50 hours or longer at about 60° C. or about 5° C.), the ink shows a drawback of generating a foreign substance therein.

SUMMARY

An advantage of some aspects of the invention is to solve these problems and to provide an ink cartridge comprising a molded article, molded from PP polymerized by a gas-phase method, not generating a foreign substance in the ink even in a prolonged standing under a harsh environment, and enabling assembling/manufacture by a vibration-welding, and producing method therefor.

Furthermore, other advantages and effects of some aspect of the invention will become apparent from the following description.

The present inventors have made eager investigation to examine the problem. As a result, it has been found that the foregoing advantages can be attained by the following constitution. The invention is mainly directed to the following items:

(1) An ink cartridge comprising a molded article including a polypropylene-based resin composition, the polypropylene-based resin composition comprising: (A) a polypropylene-based resin polymerized by a gas-phase method and having a weight-average molecular weight of $2.0\times10^5$ to $2.5\times10^5$; and (B) a hydroxide of an alkali earth metal.

(2) The ink cartridge according to Item (1), wherein the polypropylene-based resin composition further comprises (C) a filler.

(3) The ink cartridge according to Item (1), wherein the polypropylene-based resin composition further comprises (D) an antioxidant.

(4) The ink cartridge according to item (2), wherein the polypropylene-based resin composition further comprises (D) an antioxidant.

(5) The ink cartridge according to Item (1), wherein a content of the (B) hydroxide of an alkali earth metal is from 0.001 to 0.5 part by weight with respect to 100 parts by weight of the (A) polypropylene-based resin.

(6) The ink cartridge according to Item (2), wherein a content of the (C) filler is from 0.01 to 5 parts by weight with respect to 100 parts by weight of the (A) polypropylene-based resin.

(7) The ink cartridge according to Item (3), wherein a content of the (D) antioxidant is from 0.01 to 5 parts by weight with respect to 100 parts by weight of the (A) polypropylene-based resin.

(8) The ink cartridge according to item (4), wherein a content of the (D) antioxidant is from 0.01 to 5 parts by weight with respect to 100 parts by weight of the (A) polypropylene-based resin.

(9) The ink cartridge according to Item (1), wherein the (B) hydroxide of an alkali earth metal is calcium hydroxide.

(10) The ink cartridge according to item (5), wherein the (B) hydroxide of an alkali earth metal is calcium hydroxide.

(11) The ink cartridge according to Item (1), wherein the ink cartridge is produced by: contacting two or more of the molded articles each other; and vibration-welding the molded articles.

(12) A method for producing an ink cartridge, comprising: contacting two or more molded articles each other; and vibration-welding the molded articles, the molded articles comprising a polypropylene-based resin composition, the polypropylene-based resin composition comprising: (A) a polypropylene-based resin polymerized by a gas-phase method and having a weight-average molecular weight of $2.0\times10^5$ to $2.5\times10^5$; and (B) a hydroxide of an alkali earth metal.

The ink cartridge of the invention comprises a molded article including a polypropylene-based resin composition that is obtained by mixing at least (A) a polypropylene-based resin polymerized by a gas-phase method and having a weight-average molecular weight of $2.0\times10^5$ to $2.5\times10^5$ and (B) a hydroxide of an alkali earth metal. The molded article can be obtained by molding the polypropylene-based resin composition.

The molded article including such polypropylene-based resin composition, such as a cartridge main body 15 and a cover member 13, could achieve a vibration-welding in a satisfactory state, without breakage in the mutually contacting portions (director portions).

In the ink cartridge and the producing method therefor of the invention, the reason enabling the vibration-welding in satisfactory state is not yet clarified, but it is speculated that, as the polypropylene-based resin polymerized by the gas-phase method, a resin having a weight-average molecular weight within a range of $2.0\times10^5$ to $2.5\times10^5$ provides a molded article of such PP resin with a mechanical strength and thermal characteristics, suitable for vibration-welding.

Also in the ink cartridge and the producing method therefor of the invention, the reason why the ink does not generate a foreign substance in a prolonged standing under a harsh environment is not yet clarified, but it is speculated as follows.

Generation of foreign substance in the ink, in an ink container utilizing prior PP and under a harsh environment, is presumably caused by a fact that an aforementioned fatty acid metal salt, used as a neutralizer for free chlorine ions, reacts with the chlorine ion to generate a salt and at the same time liberate a fatty acid, which reacts with an ink component under a high-temperature harsh environment to generate a precipitating foreign substance.

In contrast, the invention employs, as the neutralizer for free chlorine ions, a hydroxide of an alkali earth metal such as calcium hydroxide instead of the fatty acid metal salt, thereby preventing generation of foreign substance.

DESCRIPTION OF EXEMPLARY EMBODIMENTS

Figure 1:
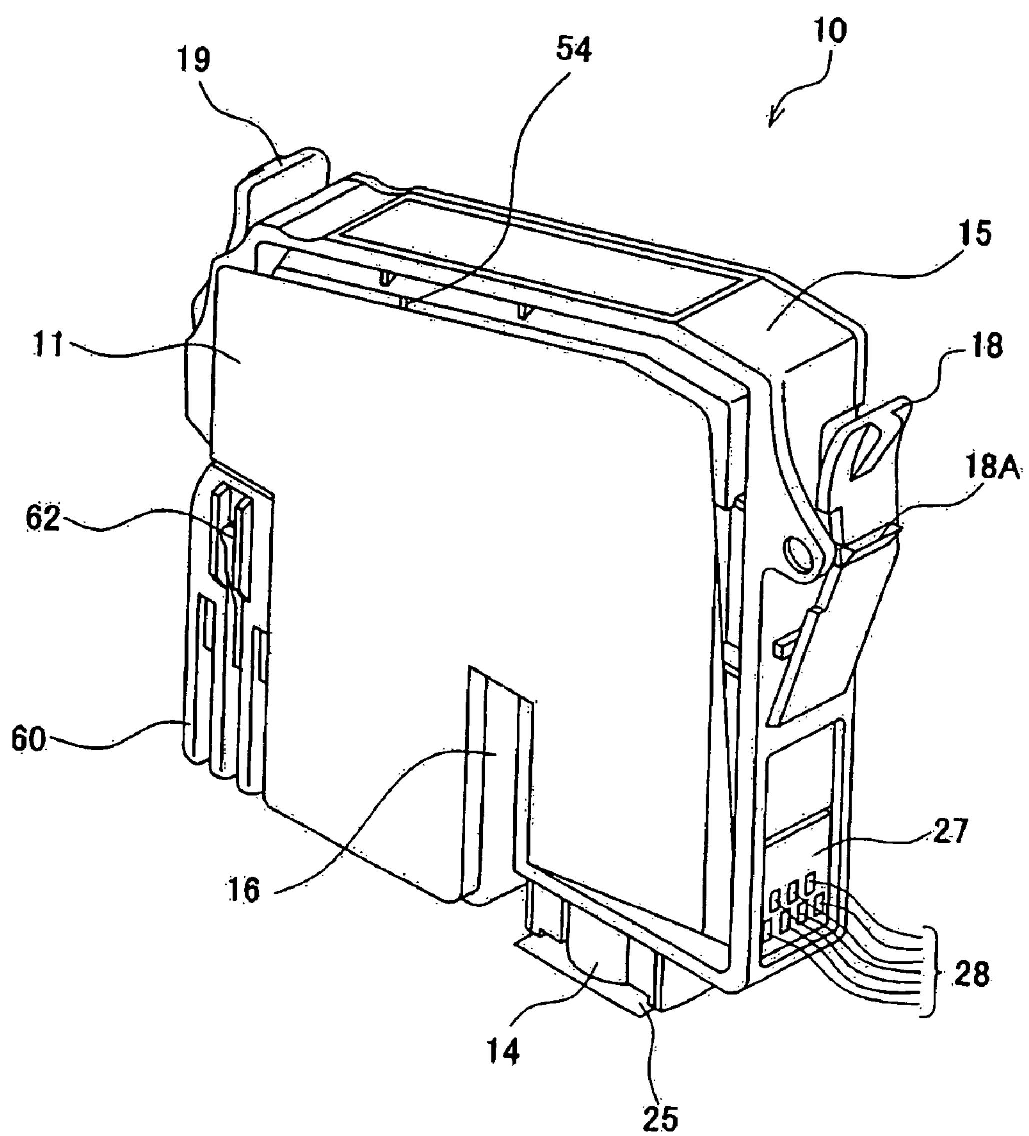
FIG. 1 is a frontal perspective view of an ink cartridge in an embodiment of the invention, seen from obliquely above.

The (A) polypropylene-based resin, to be employed in the ink cartridge of the invention and the producing method therefor, is polymerized by a gas-phase method and has a weight-average molecular weight of $2.0\times10^5$ to $2.5\times10^5$.

Such (A) polypropylene-based resin can be obtained by polymerizing propylene by general gas-phase methods and by classifying the obtained polymer for example by general molecular sieve methods.

The (B) hydroxide of alkali earth metal, to be employed in the ink cartridge of the invention and the producing method therefor, is added, instead of the fatty acid salt, as a neutralizer for capturing free chlorine ions, which are derived from a metal chloride catalyst employed in polymerization or production of the (A) polypropylene-based resin by the gas-phase method and which gives a detrimental effect on the polypropylene-based resin, and a molded article or an ink cartridge obtained therefrom.

The (B) hydroxide of alkali earth metal, employed in the invention, is not particularly restricted, and can be calcium hydroxide, magnesium hydroxide or barium hydroxide, among which calcium hydroxide is preferred.

Also the (B) hydroxide of alkali earth metal, employed in the invention, is not particularly restricted in an amount (content) thereof, which is however preferably within a range of 0.001 to 0.5 part by weight, with respect to 100 parts by weight of the (A) polypropylene-based resin.

The polypropylene-based resin composition containing (A) and (B) explained above, to be employed in the invention, may include other components.

Such other components are not particularly restricted, but can be, for example, (C) a filler.

The (C) filler employable in the invention is not particularly limited, and can be talc, mica, wollastonite, calcium carbonate, barium sulfate, magnesium carbonate, clay, alumina, silica, calcium sulfate, magnesium sulfate, carbon fibers, glass fibers, metal fibers, silica sand, carbon black, titanium oxide, magnesium hydroxide, zeolite, a molybdenum compound, diatomaceous earth, sericite, shirasu, calcium hydroxide, calcium sulfite, sodium sulfate, bentonite, or graphite. It is preferably talc, in consideration of an impact strength of resulting composition or molded article, or luster and satisfactory appearance of the molded article.

The (C) filler employable in the invention is not particularly limited in an amount (content), which is, however, preferably within a range of 0.01 to 5 parts by weight with respect to 100 part by weight of the (A) polypropylene-based resin.

Also the polypropylene-based resin composition containing (A) and (B) explained above, to be employed in the invention, may further include (D) an antioxidant.

The (D) antioxidant employable in the invention is a compound for suppressing "oxidative deterioration" of a polymer material (such as polypropylene or polyethylene) when the polymer material undergoes by heat, light or oxygen, at the molding or in the use.

Representative examples of such compound include a radical chain reaction inhibitor and a peroxide decomposer.

Examples of the radical chain reaction inhibitor include a radical trapping agent such as a hindered phenol composition, an aromatic amine composition or a hindered amine composition.

Examples of the peroxide decomposer include a compound capable of preventing the oxidative deterioration by reducing a hydroperoxide, generated by oxidative deterioration of a phosphite compound or a thio ether compound, thereby converting it into an inactive compound.

The (D) antioxidant employable in the invention is not particularly restricted in an amount (content) thereof, which is, however, preferably within a range of 0.01 to 5 parts by weight with respect to 100 part by weight of the (A) polypropylene-based resin.

Also the polypropylene-based resin composition containing (A) and (B) explained above, to be employed in the invention, may include, as other components, additives such as an ultraviolet absorber, a pigment, an antistatic, a copper-effect preventing agent, a flame retardant, a neutralizer, a foaming agent, a plasticizer, a nucleator, a defoamer, a crosslinking agent and an organic peroxide.

The ink cartridge of the invention can be produced by contacting two or more of the molded articles each other and vibration-welding the molded articles comprising the aforementioned polypropylene-based resin composition including (A) and (B).

The molded article can be obtained by extrusion molding or injection molding of the aforementioned polypropylene-based resin composition including (A) and (B).

The ink cartridge of the invention is not particularly restricted in shape, which can for example be as shown in FIG. 1.

FIG. 1 is a perspective view of an ink cartridge 10 in an embodiment of the invention.

Figure 2:
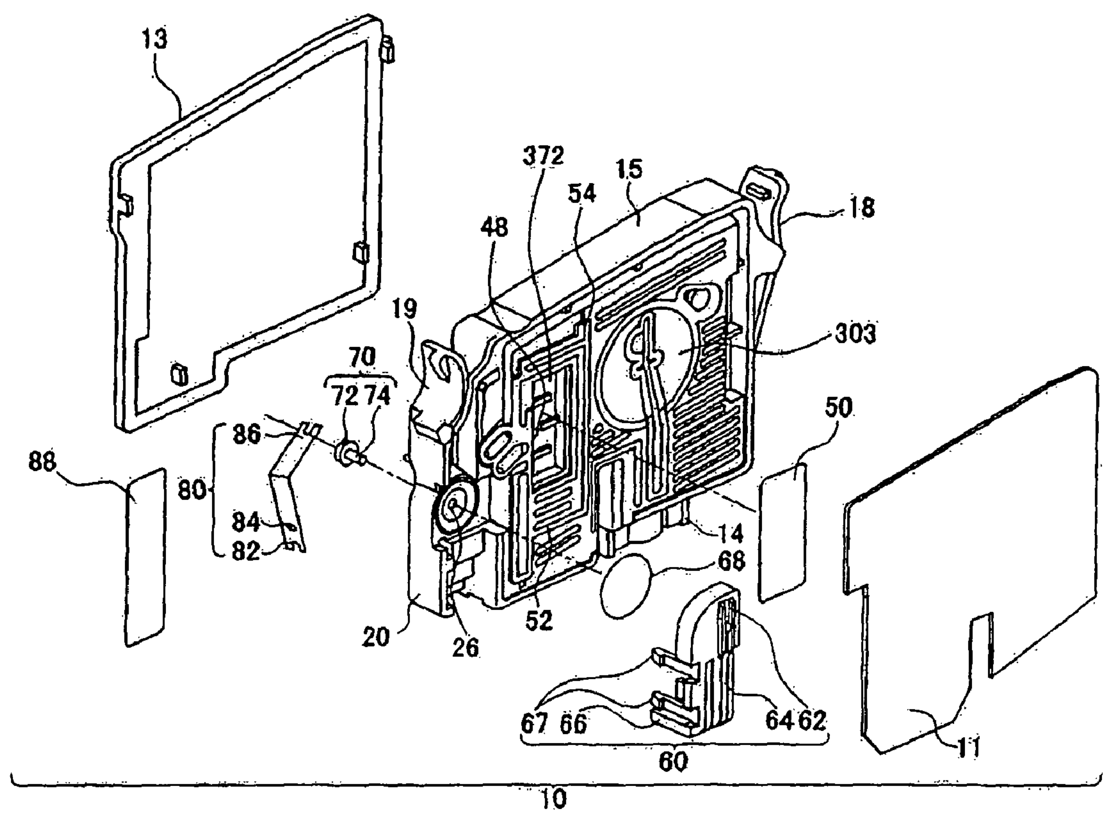
FIG. 2 is an exploded perspective view of the ink cartridge shown in FIG. 1.

FIG. 2 is an exploded perspective view of the ink cartridge 10 seen from front side.

The ink cartridge 10 constituting an embodiment of the invention, as shown in FIG. 2, includes an ink chamber main body 15 having an aperture in the rear side in order to constitute an ink chamber for containing ink, and a cover 13 for sealing the aperture of the ink chamber main body 15 by vibration-welding. The ink chamber main body 15 and the cover 13 are both molded with polypropylene-based resin composition of the invention. A front wall of the ink chamber main body 15 is provided with a groove for forming an air flow path, and a film 11 shown in FIG. 1 is applied on a substantially entire area of the front face of the ink chamber main to seal such groove, which thus functions as an air flow path. On the other hand, a part of the aperture of the ink chamber main body 15 is sealed by a film and then the entire aperture is sealed by the cover 13 to internally define an ink chamber, which functions as a single ink container.

On a bottom face of the ink cartridge 10, a hollow ink supply port 14 is formed in communication with the ink chamber through an ink flow path. The ink supply port 14 is closed, at the shipment from the factory, by a liquid-tight film 25 for preventing ink leakage, but such film 25 is broken by an ink supply needle at the mounting on an ink jet recording apparatus. In the ink supply port 14, there may be provided a valve mechanism for closing the flow path when the ink cartridge 10 is not mounted on the ink jet recording apparatus, and the ink cartridge 10 having such mechanism can be detached from and attached to the ink jet recording apparatus by any number of times, even while the ink still remains in the cartridge.

As shown in FIG. 1, a circuit board 27 is mounted on a right-hand side lateral face of the ink cartridge 10, when seen from front thereof. The circuit board 27 has a semiconductor memory device such as an EEPROM on a rear surface, and plural contact terminals 28 on a front surface. Such contact terminals 28 are provided in a position coming into contact with electrodes of an external control apparatus when the ink cartridge 10 is mounted on the ink jet recording apparatus, and ink-related information, such as ink specifications and information on the consumption amount, is read from and written into the semiconductor memory device from time to time. In such constitution, necessary ink-related information is held in the ink cartridge 10 itself even when the ink cartridge 10 is detached from the ink jet recording apparatus, and such information is read out for executing an appropriate print control when the ink cartridge is mounted again on the ink jet recording apparatus. Also the circuit board 27 may be made detachable from the ink cartridge 10, and the semiconductor memory device may be mounted in another position of the ink cartridge 10 and connected with the contact terminals 28 through wirings.

The ink cartridge 10 is also provided with a flexible engaging lever 18 and a holding lever 19, extending upwards from central portions of opposed two lateral faces. These levers 18, 19 are formed integrally with the ink chamber main body 15, by the polypropylene-based resin composition of the invention.

Also in the front face side of the ink cartridge 10, in the vicinity of the ink supply port 14 and at a central part of the lateral width of the front face, a slit portion 16 is provided along an inserting direction of an ink supply needle (not shown) into the ink supply port 14. Such slit portion 16 engages, when the ink cartridge 10 is mounted on a carriage (not shown), with a guide projection (not shown) standing vertically on the carriage in the vicinity of the ink supply needle, in order to position the opening surface of the ink supply port 14 exactly perpendicularly to the ink supply needle before the ink supply port 14 reaches the ink supply needle. Thus the ink supply needle is exactly positioned with and inserted into the ink supply port 14.

Also, an identification member 60, formed as a separate member from the ink chamber main body 15, is provided at an end below the front face of the ink cartridge 10. The identification member 60 has a different shape according to the type of the ink cartridge 10, for example for each ink color, and is so designed as to engage, as in a key-keyhole relationship, with another identification projection (not shown) provided on the carriage. In this manner, the ink cartridge 10 can be prevented from insertion into an unintended position, namely so-called erroneous insertion.

EXAMPLES

The invention is now illustrated in greater detail with reference to Examples and Comparative Examples, but it should be understood that the invention is not to be construed as being limited thereto.

Example 1

Propylene was polymerized by a general gas-phase method, and an obtained polymer was classified by a general molecular sieve method to obtain a polypropylene-based resin (A-1) having a weight-average molecular weight of $2.1\times10^5$.

100 parts by weight of the polypropylene-based resin (A-1), 0.05 part by weight of calcium hydroxide, 1.0 part by weight of talc (trade name: HI-FILLER 5000PJT7, manufactured by Muramatsu Sangyo Co.), and 0.05 part by weight of IRGANOX 107 (antioxidant) were changed in a pelletizer to obtain pellets of a polypropylene-based resin composition.

The pellets of polypropylene-based resin composition thus obtained were subjected to an injection molding with a NN220α-type injection molder (manufactured by Niigata Tekkou Co.) and metal molds for the ink chamber main body 15 and the cover 13 shown in FIG. 2, under conditions of a molding temperature of 180° C., a mold cooling temperature of 40° C., an injection time of 20 seconds and a cooling time of 25 seconds.

Then, thus obtained ink chamber main body 15 and cover 13 of the shapes shown in FIG. 2 were vibration-welded by a vibration welder (MICRO VW, manufactured by Branson Inc.) under conditions of a frequency of 24.0 KHz, a vibration amplitude of 0 to 1.8 mm and a maximum pressure of 450 kg. As a result, the ink chamber main body 15 and the cover 13 were appropriately welded.

Figures 3, 4:
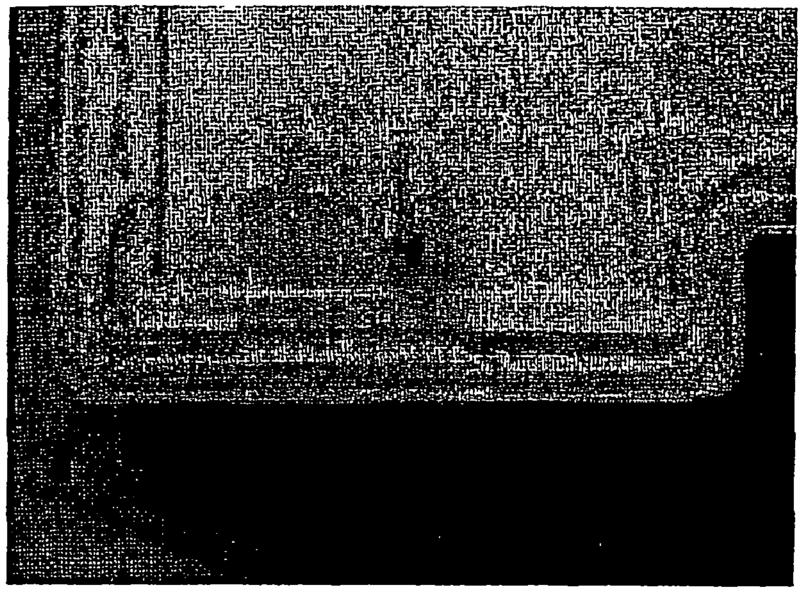
FIG. 3 is a photograph showing a state of director portion of a cover, after vibration-welding in Example 1.
FIG. 4 is a photograph showing a state of director portion of an ink chamber main body, after vibration-welding in Example 1.

Also the ink chamber main body 15 and the cover 13 thus welded were peeled off and the adjoined parts (director parts) were observed visually. As a result, as shown in FIGS. 3 and 4, damages such as splitting or tumbling were not observed, and two bank-shaped portions of the director of the cover 13 were observed to have been uniformly melted.

Figure 9:
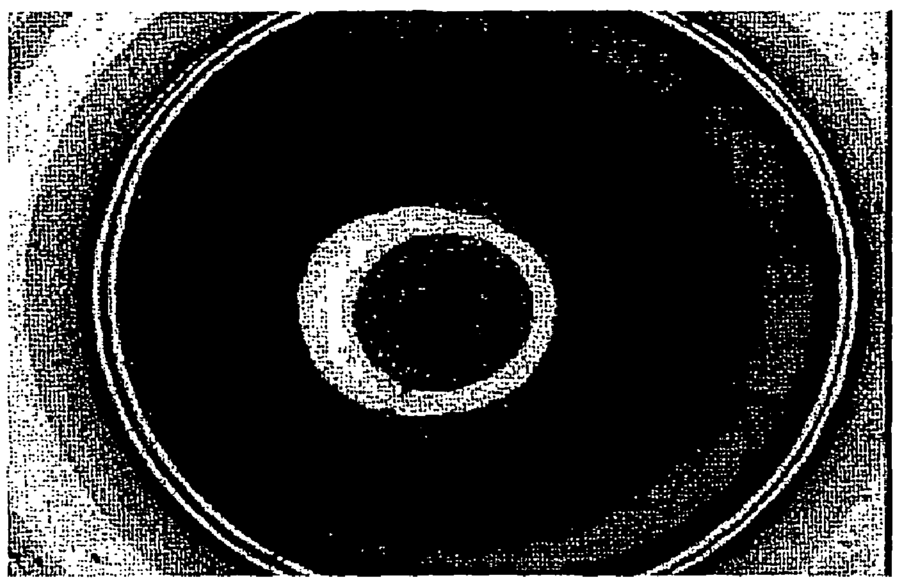
FIG. 9 is a photograph showing presence/absence of foreign substance generation after storage under harsh environment in Example 1.

Also a black ink that filled in a Seiko Epson ink cartridge ICBk32 was filled in the ink cartridge obtained by the vibration-welding, then stored for 5 days at 60° C. and then for 3 days at 5° C., and generation of foreign substance was visually inspected. As a result, no generation of foreign substance was observed as shown in FIG. 9.

Comparative Example 1

Figure 5:
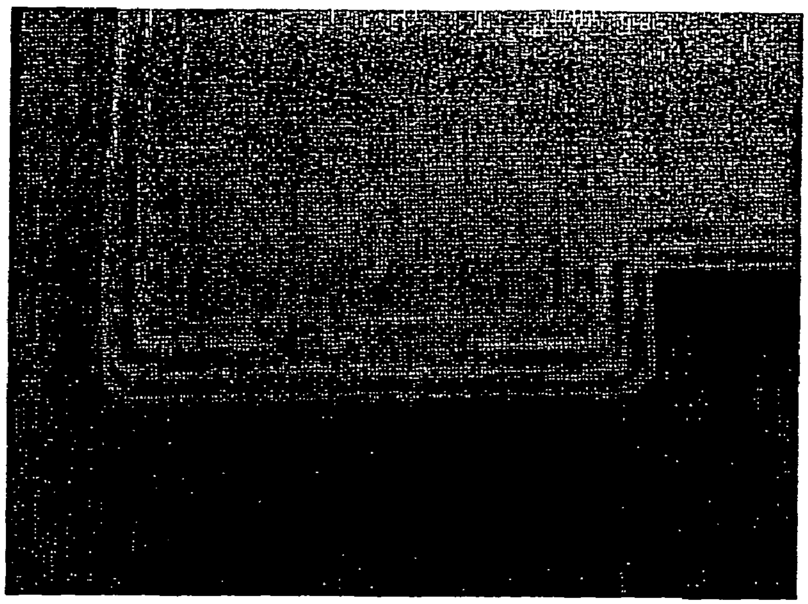
FIG. 5 is a photograph showing a state of director portion of a cover, after vibration-welding in Comparative Example 1.
Figure 6:
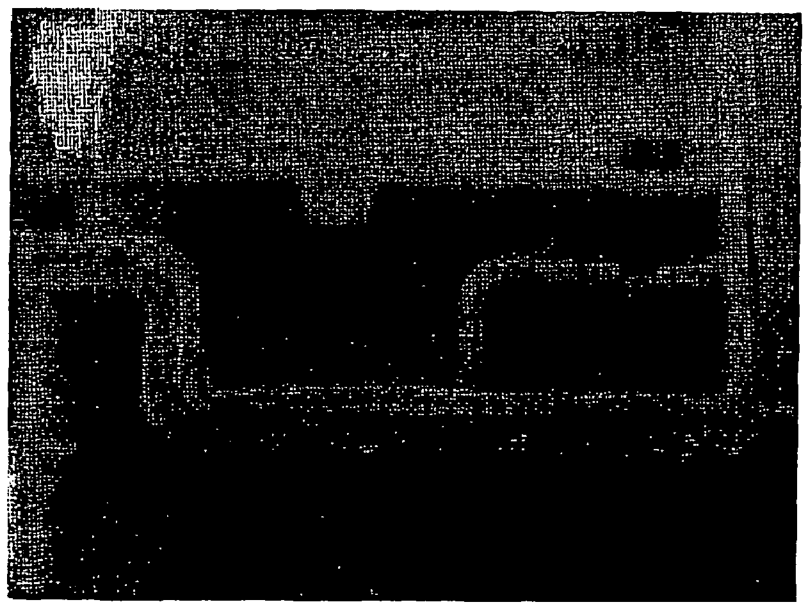
FIG. 6 is a photograph showing a state of director portion of an ink chamber main body, after vibration-welding in Comparative Example 1.

An ink chamber main body 15 and a cover 13 of shapes shown in FIG. 2 were molded and vibration-welded in the same manner as in Example 1, except for employing a polypropylene-based resin (A-2) of a weight-average molecular weight of $1.9\times10^5$, which was prepared by polymerizing propylene by a general gas-phase method but omitting a classification by a general molecular sieve method. As a result, as shown in FIGS. 5 and 6, damages such as splitting or tumbling were observed in the adjoined parts (director) of the ink chamber main body 15 and the cover 13, indicating that a satisfactory welding was not attained. Also it was observed that only one of the two bank-shaped portions of the director in the cover 13 was melted.

Since a satisfactory welding could not be attained, an ink cartridge could not be obtained, and a test for generation of foreign substance could not be conducted.

Comparative Example 2

Figures 7, 8:
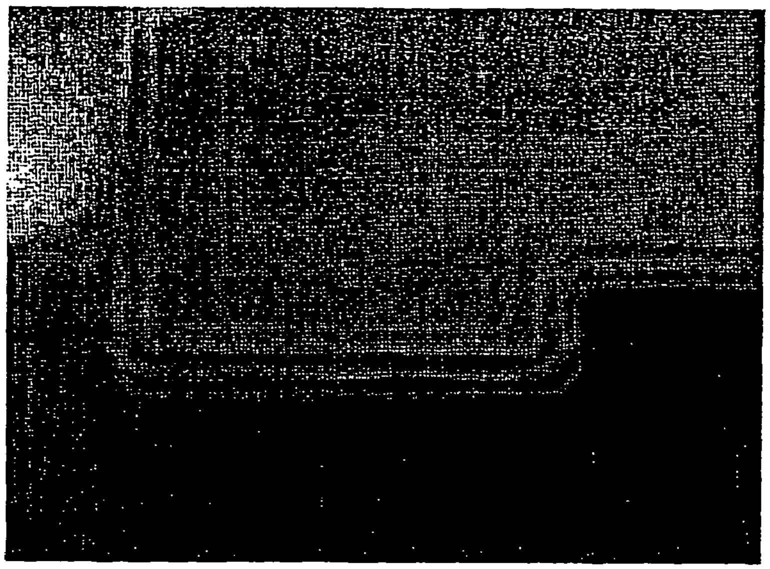
FIG. 7 is a photograph showing a state of director portion of a cover, after vibration-welding in Comparative Example 2.
FIG. 8 is a photograph showing a state of director portion of an ink chamber main body, after vibration-welding in Comparative Example 2.

An ink chamber main body 15 and a cover 13 of shapes shown in FIG. 2 were molded and vibration-welded in the same manner as in Example 1, except for employing a polypropylene-based resin (A-3) of a weight-average molecular weight of $2.0\times10^5$, which was prepared by polymerizing propylene by a general solvent method and omitting a classification by a general molecular sieve method, and employing calcium stearate as a neutralizer instead of calcium hydroxide. As a result, the ink chamber main body 15 and the cover 13 were appropriately welded. Also the ink chamber main body 15 and the cover 13 thus welded were peeled off and the adjoined parts (director parts) were observed visually. As a result, as shown in FIGS. 7 and 8, damages such as splitting or tumbling were not observed.

Figure 10:
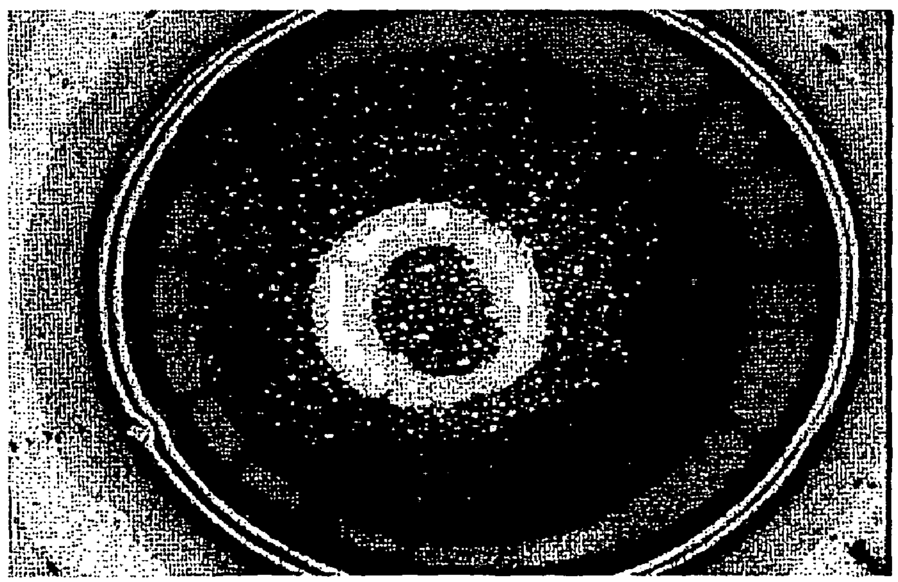
FIG. 10 is a photograph showing presence/absence of foreign substance generation after storage under harsh environment in Comparative Example 2.

However, when an ink was filled in the obtained cartridge and stored under harsh environments as in Example 1 and generation of foreign substance was inspected, generation of foreign substance was observed as shown in FIG. 10.

While the invention has been described in detail and with reference to specific embodiments thereof, it will be apparent to one skilled in the art that various changes and modifications can be made therein without departing from the spirit and scope thereof.

What is claimed is:

1. An ink cartridge comprising a main body having an ink chamber comprising a first molded article, and a cover comprising a second molded article, each of the first molded article and second molded article comprising a polypropylene based resin composition that is free from fatty acid metal salt, the polypropylene-based resin composition comprising:

(A) a polypropylene-based resin polymerized by a gas-phase method and having a weight-average molecular weight that makes the molded articles comprising the resin suitable for vibration welding, the weight-average molecular weight being in a range of $2.0\times10^5$ to $2.5\times10^5$; and (B) a hydroxide of an alkali earth metal, wherein the cover is vibration-welded with the main body.

2. The ink cartridge according to claim 1, wherein the polypropylene-based resin composition further comprises (C) a filler.

3. The ink cartridge according to claim 2, wherein the polypropylene-based resin composition further comprises (D) an antioxidant.

4. The ink cartridge according to claim 3, wherein a content of the (D) antioxidant is from 0.01 to 5 parts by weight with respect to 100 parts by weight of the (A) polypropylene-based resin.

5. The ink cartridge according to claim 2, wherein a content of the (C) filler is from 0.01 to 5 parts by weight with respect to 100 parts by weight of the (A) polypropylene-based resin.

6. The ink cartridge according to claim 1, wherein the polypropylene-based resin composition further comprises (D) an antioxidant.

7. The ink cartridge according to claim 6, wherein a content of the (D) antioxidant is from 0.01 to 5 parts by weight with respect to 100 parts by weight of the (A) polypropylene-based resin.

8. The ink cartridge according to claim 1, wherein a content of the (B) hydroxide of an alkali earth metal is from 0.001 to 0.5 part by weight with respect to 100 parts by weight of the (A) polypropylene-based resin.

9. The ink cartridge according to claim 8, wherein the (B) hydroxide of an alkali earth metal is calcium hydroxide.

10. The ink cartridge according to claim 1, wherein the (B) hydroxide of an alkali earth metal is calcium hydroxide.

11. A method for producing the ink cartridge according to claim 1, comprising:

contacting at least the first and second molded articles with each other; and vibration-welding the molded articles.

* * * * *